(12) United States Patent
Jerichow et al.

(10) Patent No.: US 11,212,321 B2
(45) Date of Patent: Dec. 28, 2021

(54) GROUP COMMUNICATION SERVICE ENABLER SECURITY

(71) Applicant: NOKIA SOLUTIONS AND NETWORKS OY, Espoo (FI)

(72) Inventors: Anja Jerichow, Grafing (DE); Thomas Belling, Erding (DE); Guenther Horn, Munich (DE)

(73) Assignee: NOKIA SOLUTIONS AND NETWORK OY, Espoo (FI)

( * ) Notice: Subject to any disclaimer, the term of this patent is extended or adjusted under 35 U.S.C. 154(b) by 150 days.

(21) Appl. No.: 15/504,924

(22) PCT Filed: Aug. 17, 2015

(86) PCT No.: PCT/EP2015/068809
§ 371 (c)(1),
(2) Date: Feb. 17, 2017

(87) PCT Pub. No.: WO2016/026798
PCT Pub. Date: Feb. 25, 2016

(65) Prior Publication Data
US 2017/0264647 A1   Sep. 14, 2017

Related U.S. Application Data

(60) Provisional application No. 62/038,518, filed on Aug. 18, 2014.

(51) Int. Cl.
*H04L 29/06* (2006.01)
*H04W 4/06* (2009.01)
(Continued)

(52) U.S. Cl.
CPC .............. *H04L 63/205* (2013.01); *H04W 4/06* (2013.01); *H04W 12/033* (2021.01); *H04L 69/16* (2013.01); *H04W 12/04* (2013.01)

(58) Field of Classification Search
CPC ........ H04L 63/205; H04L 69/16; H04W 4/06; H04W 12/04
(Continued)

(56) References Cited

U.S. PATENT DOCUMENTS 6,374,102 B1 * 4/2002 Brachman ............. H04W 76/00
455/422.1
6,577,874 B1 * 6/2003 Dailey .................... H04W 8/26
455/404.1

(Continued)

OTHER PUBLICATIONS

3rd Generation Partnership Project; Technical Specification Group Services and System Aspects; Study on security issues to support Group Communication System Enablers for LTE (GCSE_LTE) (Release 12) (Jan. 2014) (Year: 2014).*

(Continued)

*Primary Examiner* — Tae K Kim
*Assistant Examiner* — Peiliang Pan
(74) *Attorney, Agent, or Firm* — Squire Patton Boggs (US) LLP (57) ABSTRACT

Systems, methods, apparatuses, and computer program products for securing user plane (e.g., MB2-U) interface between a group communication service application server (GCS AS) and Broadcast Multicast Service Center (BM-SC) are provided. One method may include transmitting a message via a control plane, to an application server, indicating whether to establish a security association on a user plane in an interface between the GCS AS and the BM-SC. The method may also include providing, to the GCS AS, a target internet protocol (IP) address and possible port as a target for the security association.

18 Claims, 5 Drawing Sheets

(51) Int. Cl.
*H04W 12/033* (2021.01)
*H04W 12/04* (2021.01)

(58) Field of Classification Search
USPC .................................................. 726/3
See application file for complete search history.

(56) References Cited

U.S. PATENT DOCUMENTS

| | | | | |
|---|---|---|---|---|
| 6,654,615 | B1* | 11/2003 | Chow | H04W 76/15 455/555 |
| 6,710,702 | B1* | 3/2004 | Averbuch | H04L 29/06 340/7.1 |
| 7,305,546 | B1* | 12/2007 | Miller | H04L 63/029 713/153 |
| 7,386,000 | B2* | 6/2008 | Lopponen | H04L 12/1818 370/433 |
| 7,899,451 | B2* | 3/2011 | Hu | H04W 48/17 455/422.1 |
| 8,068,843 | B2* | 11/2011 | Yi | H04W 72/005 455/450 |
| 8,184,644 | B1* | 5/2012 | Chen | H04L 43/0805 370/401 |
| 8,213,310 | B2* | 7/2012 | Santhanam | H04W 76/36 370/231 |
| 8,284,773 | B1* | 10/2012 | Woleben | H04L 12/189 370/310 |
| 8,635,678 | B2* | 1/2014 | Raleigh | G06Q 10/06375 726/5 |
| 8,755,389 | B1* | 6/2014 | Poutievski | H04L 45/245 370/395.31 |
| 8,830,894 | B2* | 9/2014 | Xu | H04W 72/005 370/311 |
| 9,319,851 | B2* | 4/2016 | Yu | H04W 4/08 |
| 10,225,820 | B2* | 3/2019 | Zhang | H04W 72/005 |
| 2003/0153339 | A1* | 8/2003 | Crockett | H04M 3/56 455/518 |
| 2003/0214925 | A1* | 11/2003 | Cervera | H04W 92/14 370/335 |
| 2004/0218607 | A1* | 11/2004 | Hurtta | H04L 47/822 370/395.21 |
| 2005/0152367 | A1* | 7/2005 | Park | H04L 12/185 370/390 |
| 2005/0233732 | A1* | 10/2005 | Kwak | H04W 68/00 455/414.1 |
| 2005/0288049 | A1* | 12/2005 | Gill | H04W 76/45 455/518 |
| 2006/0034202 | A1* | 2/2006 | Kuure | H04W 4/06 370/312 |
| 2006/0176838 | A1* | 8/2006 | Lee | H04L 12/189 370/312 |
| 2006/0215684 | A1* | 9/2006 | Capone | H04L 63/029 370/437 |
| 2007/0165622 | A1* | 7/2007 | O'Rourke | H04L 67/1002 370/389 |
| 2008/0031245 | A1* | 2/2008 | Pekonen | H04L 12/1886 370/390 |
| 2008/0075097 | A1* | 3/2008 | Kitada | H04L 29/12367 370/401 |
| 2009/0201854 | A1* | 8/2009 | Roger | H04W 72/005 370/328 |
| 2010/0014450 | A1* | 1/2010 | Chun | H04L 12/189 370/312 |
| 2010/0128727 | A1* | 5/2010 | Takechi | H04L 69/04 370/392 |
| 2010/0165901 | A1* | 7/2010 | Kim | H04W 72/005 370/312 |
| 2011/0136488 | A1* | 6/2011 | Kuwali | H04L 67/2842 455/436 |
| 2011/0165905 | A1* | 7/2011 | Shuman | H04W 64/00 455/518 |
| 2011/0175976 | A1* | 7/2011 | Cho | H04L 65/80 348/14.02 |
| 2011/0202593 | A1* | 8/2011 | Vaderna | H04W 8/22 709/203 |
| 2011/0305183 | A1* | 12/2011 | Hsu | H04W 72/005 370/312 |
| 2012/0030707 | A1* | 2/2012 | Cedervall | H04N 7/17318 725/38 |
| 2013/0059622 | A1* | 3/2013 | Agulnik | H04W 4/08 455/518 |
| 2013/0077481 | A1* | 3/2013 | Philavong | H04L 45/38 370/228 |
| 2013/0094350 | A1* | 4/2013 | Mandal | H04L 45/64 370/217 |
| 2013/0142166 | A1* | 6/2013 | Bogineni | H04W 8/02 370/331 |
| 2013/0194999 | A1* | 8/2013 | Anchan | H04W 4/06 370/312 |
| 2013/0215817 | A1* | 8/2013 | Lu | H04L 67/22 370/312 |
| 2013/0230047 | A1* | 9/2013 | Subrahmaniam | H04L 47/2441 370/392 |
| 2013/0242730 | A1* | 9/2013 | Pelletier | H04W 28/0284 370/230 |
| 2014/0016491 | A1* | 1/2014 | Gholmieh | H04L 5/00 370/252 |
| 2014/0098671 | A1* | 4/2014 | Raleigh | H04L 69/14 370/235 |
| 2014/0195102 | A1* | 7/2014 | Nathanson | G07C 5/0808 701/31.4 |
| 2014/0206373 | A1* | 7/2014 | Ljung | H04W 48/06 455/452.1 |
| 2014/0269269 | A1* | 9/2014 | Kowali | H04W 24/04 370/229 |
| 2014/0286222 | A1* | 9/2014 | Yu | H04W 4/08 370/312 |
| 2014/0307738 | A1* | 10/2014 | Chen | H04L 69/22 370/392 |
| 2014/0341047 | A1* | 11/2014 | Sadeh | H04L 41/0681 370/252 |
| 2015/0110095 | A1* | 4/2015 | Tan | H04W 40/02 370/338 |
| 2015/0181382 | A1* | 6/2015 | McDonald | H04L 67/18 455/456.3 |
| 2015/0244590 | A1* | 8/2015 | Lin | H04L 49/00 370/392 |
| 2015/0263847 | A1* | 9/2015 | Baillargeon | H04L 7/0008 370/216 |
| 2015/0271056 | A1* | 9/2015 | Chunduri | H04L 45/02 370/238 |
| 2015/0312781 | A1* | 10/2015 | Chowdhary | H04W 24/04 455/424 |
| 2015/0350060 | A1* | 12/2015 | Patil | H04L 45/22 370/238 |
| 2016/0119157 | A1* | 4/2016 | Hua | H04L 49/35 370/312 |
| 2016/0165413 | A1* | 6/2016 | Bhalla | H04W 4/08 455/456.5 |
| 2017/0142756 | A1* | 5/2017 | Lee | H04W 76/45 |
| 2017/0264647 | A1* | 9/2017 | Jerichow | H04L 63/205 |

OTHER PUBLICATIONS

"3GPP TR 33.888 V12.0.0 (Jun. 2014) 3rd Generation Partnership Project; Technical Specification Group Services and System Aspects; Study on security issues to support Group Communication System Enablers (GCSE) for LTE (Release 12)", 3GPP, Jun. 2014 (Year: 2014).*
International Search Report and Written Opinion dated Oct. 30, 2015 corresponding to International Patent Application No. PCT/EP2015/068809.
3GPP TR 33.8ab V0.1.0 (Nov. 2013), Technical Report, 3rd Generation Partnership Project; Technical Specification Group Services and System Aspects; Study on security issues to support Group Communication System Enablers for LTE (GCSE_LTE) (Release 12), 3GPP Draft; S3-131129-V5, Dec. 2, 2013, XP050766098, 19 pages.

(56) References Cited

OTHER PUBLICATIONS

NSN et al.: "Merger of S3-130966 and S3-131052, GCSE Key issue—GC2 interface," 3GPP Draft; S3-131120-V3, 3GPP TSG SA WG3 (Security) Meeting #73, San Francisco, Nov. 21, 2013, XP050766160.
Qualcomm Incorporated, "Clarifications on interface between the BMSC and the GCSE application server," 3GPP Draft; S2-133652, SA WG2 Meeting #99, Xiamen, China, Sep. 27, 2013, XP050727039.
3GPP TS 33.246 V12.0.0 (Jun. 2014), Technical Specification, 3rd Generation Partnership Project; Technical Specification Group Services and System Aspects; 3G Security; Security of Multimedia Broadcast/Multicast Service (MBMS) (Release 12), 3GPP Draft; Jun. 19, 2014, XP050838126, pp. 1-73.
3GPP TS 23.468 V12.0.0 (Feb. 2014), Technical Specification, 3rd Generation Partnership Project; Technical Specification Group Services and System Aspects; Group Communication System Enablers for LTE (GCSE_LTE) Stage 2 (Release 12), 3GPP Draft; Mar. 10, 2014, XP050835338, pp. 1-26.
Qualcomm Incorporated, "Clarifications on interface between the BMSC and the GCSE application server," 3GPP Draft; S2-132551, SA WG2 Meeting #98, Valencia, Spain, Jul. 9, 2013, XP050725937.
3GPP TS 22.468 V12.0.0 (Jun. 2013), Technical Specification, 3rd Generation Partnership Project; Technical Specification Group Services and System Aspects; Group Communication System Enablers for LTe (GCSE_LTE) (Release 12), 3GPP Draft; Jun. 2013, pp. 1-22.
3GPP TS 29.368 V12.1.0 (Jun. 2014), Technical Specification, 3rd Generation Partnership Project; Technical Specification Group Core Network and Terminals; Tsp interface protocol between the MTC Interworking Function (MTC-IWF) and Service Capability Server (SCS) (Release 12), 3GPP Draft; Jun. 2014, pp. 1-28.
3GPP TS 29.468 V1.0.0 (Jun. 2014), Technical Specification, 3rd Generation Partnership Project; Technical Specification Group core Network and Terminals; Group Communication System Enablers for LTE (GCSE_LTE); MB2 Reference Point; Stage 3 (Release 12), 3GPP Draft; Jun. 2014, pp. 1-26.
J. Postel, "User Datagram Protocol," RFC 768, Aug. 28, 1980, pp. 1-3.
D. Harkins et al., "The Internet Key Exchange (IKE)," Network Working Group, RFC 2409, Nov. 1998.
P. Calhoun et al., "Diameter Base Protocol," Network Working Group, RFC 3588, Sep. 2003.
3GPP TR 33.888 V12.0.0 (Jun. 2014), Technical Report, 3rd Generation Partnership Project; Technical Specification Group Services and System Aspects; Study on security issues to support Group Communication System Enablers (GCSE) for LTE (Release 12), Jun. 2014, 44 pages.
A. Huttunen et al., "UDP Encapsulation of IPsec ESP Packets," Network Working Group, RFC 3948, Jan. 2005, pp. 1-15.
S. Kent et al., "Security Architecture for the Internet Protocol," Network Working Group, RFC 4301, Dec. 2005.
E. Rescorla et al., "Datagram Transport Layer Security," Network Working Group, RFC 4347, Apr. 2006.
T. Dierks et al., "The Transport Layer Security (TLS) Protocol Version 1.2," Network Working Group, RFC 5246, Aug. 2008.
C. Kaufman et al., "Internet Key Exchange Protocol Version 2 (IKEv2)," Internet Engineering Task Force (IETF), RFC 5996, Sep. 2010.
E. Rescorla et al., "Datagram Transport Layer Security Version 1.2," Internet Engineering Task Force (IETF), RFC 5347, Jan. 2012.
V. Fajardo et al., "Diameter Base Protocol," Internet Engineering Task Force (IETF), RFC 6733, Oct. 2012.
European Office Action corresponding to European Appln. No. 15 750 746.8, dated Jul. 23, 2019.

* cited by examiner

GROUP COMMUNICATION SERVICE ENABLER SECURITY

CROSS REFERENCE TO RELATED APPLICATIONS

This application claims priority to U.S. provisional application No. 62/038,518, filed on Aug. 18, 2014. The entire contents of this earlier filed application are hereby incorporated by reference in its entirety.

FIELD

Embodiments of the invention may generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology.

BACKGROUND

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

One the key features of LTE-A is carrier aggregation, which allows for increasing the data rates through aggregation of two or more LTE carriers.

3GPP system provides enablers to support group communication services using EUTRAN access. The group communication system is represented by an Application Server (GCS AS) using the 3GPP system provided enablers for transferring its application signalling and for delivering application data, such as media data, to a group of UEs either (1) over Multimedia Broadcast Multicast Services (MBMS) bearer services using the broadcast mode of MBMS; or (2) over evolved packet system (EPS) bearers; or (3) over both MBMS and EPS bearer services.

SUMMARY

One embodiment is directed to a method, which may include transmitting a message via a control plane, to an application server, indicating whether to establish a security association on a user plane in an interface between the application server and a broadcast multicast service center. The method may also include providing, to the application server, a target internet protocol (IP) address and possible port as a target for the security association.

In an embodiment, the providing may further include providing at least one of: an internet protocol (IP) address and port to use on the application server for the security association, the internet protocol (IP) address and port to use on the broadcast multicast service center for the security association, a shared key, a validity time for a security association, or more additional options including cipher suite and/or minimal key length.

According to one embodiment, the method may further include receiving a request via a MB2-C control interface from the application server to establish a MB2-U connection. In certain embodiments, the transmitting may further include instructing the application server in a reply via the MB2-C control interface whether to establish a security association for the user plane in the MB2-U interface, and the providing may further include providing the target IP address and possible use datagram protocol (UDP) port as the target for the security association.

Another embodiment is directed to an apparatus that may include at least one processor and at least one memory comprising computer program code. The at least one memory and the computer program code are configured, with the at least one processor, to cause the apparatus at least to transmit a message via a control plane, to an application server, indicating whether to establish a security association on a user plane in an interface between the application server and the apparatus, and to provide, to the application server, a target internet protocol (IP) address and possible port as a target for the security association.

Another embodiment is directed to an apparatus that may include transmitting means for transmitting a message via a control plane, to an application server, indicating whether to establish a security association on a user plane in an interface between the application server and the apparatus. The apparatus may also include providing means for providing, to the application server, a target internet protocol (IP) address and possible port as a target for the security association.

In an embodiment, the providing means may further include means for providing at least one of: an internet protocol (IP) address and port to use on the application server for the security association, the internet protocol (IP) address and port to use on the broadcast multicast service center for the security association, a shared key, a validity time for a security association, or more additional options including cipher suite and/or minimal key length.

According to one embodiment, the apparatus may further include receiving means for receiving a request via a MB2-C control interface from the application server to establish a MB2-U connection. In some embodiments, the transmitting means may further include means for instructing the application server in a reply via the MB2-C control interface whether to establish a security association for the user plane in the MB2-U interface, and the providing means may further include means for providing the target IP address and possible use datagram protocol (UDP) port as the target for the security association. In an embodiment, the apparatus may be a broadcast multicast service center.

Another embodiment is directed to a method, which may include receiving a message from a broadcast multicast service center (BM-SC) via a control interface, wherein the message indicates whether to establish a security association on a user plane in an interface between an application server and the broadcast multicast service center (BM-SC). The method may also include receiving a target internet protocol (IP) address and possible port as a target for the security association.

In one embodiment, the method may also include setting up the security association using a security protocol selected by the application server. According to an embodiment, the method may also include sending related signaling towards the IP address indicated by the broadcast multicast service center (BM-SC). In certain embodiments, the security protocol may include at least one of: Internet Key Exchange (IKE)/IPsec or user datagram protocol (UDP) encapsulated IKE/IPsec or Datagram Transport Layer Security (DTLS).

Another embodiment is directed to an apparatus that may include at least one processor and at least one memory comprising computer program code. The at least one memory and the computer program code are configured, with the at least one processor, to cause the apparatus at least to receive a message from a broadcast multicast service center (BM-SC) via a control interface, wherein the message indicates whether to establish a security association on a user plane in an interface between the apparatus and the broadcast multicast service center (BM-SC), and to receive a target internet protocol (IP) address and possible port as a target for the security association.

Another embodiment is directed to an apparatus which may include receiving means for receiving a message from a broadcast multicast service center (BM-SC) via a control interface, wherein the message indicates whether to establish a security association on a user plane in an interface between the apparatus and the broadcast multicast service center (BM-SC). The apparatus may also include receiving means for receiving a target internet protocol (IP) address and possible port as a target for the security association.

In an embodiment, the apparatus may further include means for setting up the security association using a security protocol selected by the application server. According to one embodiment, the apparatus may also include sending means for sending related signaling towards the IP address indicated by the broadcast multicast service center (BM-SC). In certain embodiments, the security protocol may include at least one of: Internet Key Exchange (IKE)/IPsec or user datagram protocol (UDP) encapsulated IKE/IPsec or Datagram Transport Layer Security (DTLS). According to some embodiments, the apparatus may be a group communication system application server (GCS AS).

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for securing MB2-U interface between group communication service application server (GCS AS) and Broadcast Multicast Service Center (BM-SC), as represented in the attached figures, is not intended to limit the scope of the invention, but is merely representative of selected embodiments of the invention. It will also be readily understood that the references herein are exemplary and not intended to limit the scope of the invention, which may apply to newer and/or other versions of the 3GPP specifications and to newer versions or updates of the referenced Diameter RFC, e.g., RFC 6733 [X].

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
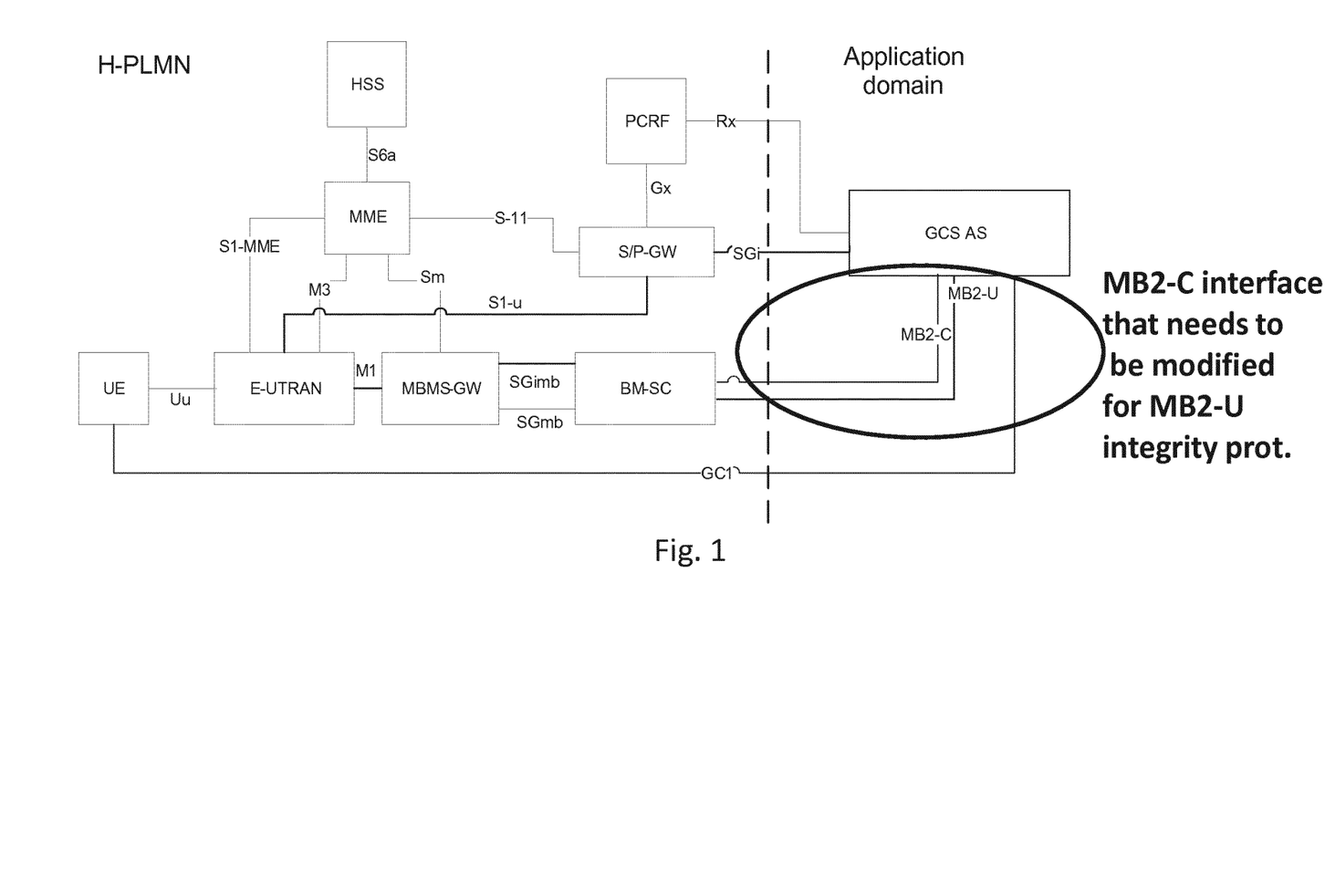
FIG. 1 illustrates an example of a non-roaming architecture model for GCSE_LTE

Embodiments of the invention may generally relate to security for Group Communication Service Enabler (GCSE), which may be applied for critical communication/ public safety in LTE networks, as specified in 3GPP TS 23.468 [X]. More specifically, certain embodiments relate to the security of the MB2 interface between GCS AS (Application Server) and BM-SC (Broadcast Multicast Service Center). The MB2 interface is comprised of a control plane part (MB2-C) and a user plane part (MB2-U). FIG. 1 illustrates an example of a non-roaming architecture model for GCSE_LTE in which embodiments of the invention may be applicable.

Aspects of GCSE security have been specified in 3GPP TS 33.246 [X]. GCS application server (AS) connects to the BM-SC for Broadcast Delivery via the MB2-C/U interface. For the MB2-C interface, Diameter as specified in IETF RFC 3588 [X] or IETF RFC 6733 [X] with the specific GCSE security mechanisms as specified in 3GPP TS 33.246 [X], Annex N, are used to mutually authenticate AS and BM-SC and to authorize the communication. Therefore, BM-SC and AS have already exchanged relevant security information via MB2-C, trust each other, and have established a protected channel between them before finally the AS transfers user data to the BM-SC via MB2-U for Broadcast Delivery. The existing protocol stack at the MB2-U interface is "IP/UDP/transparent user plane data", where the "transparent user plane data" are transmitted unmodified from the AS to the terminal and may be encrypted. For this data transfer, BM-SC may need to open a port that allows the reception of broadcast data. This is done on the "Activate MBMS Bearer" procedure on MB2-C as described in 3GPP 29.468 [X], section 5.3.2: For a successful MBMS bearer activation, the MBMS Bearer Response AVP shall include the TMGI AVP, the MBMS-Flow-Identifier AVP, the MBMS Session Duration AVP, the BM-SC Address AVP and BM-SC Port AVP, and may include Radio Frequency AVP(s) as MBMS bearer related service description.

Figure 2:
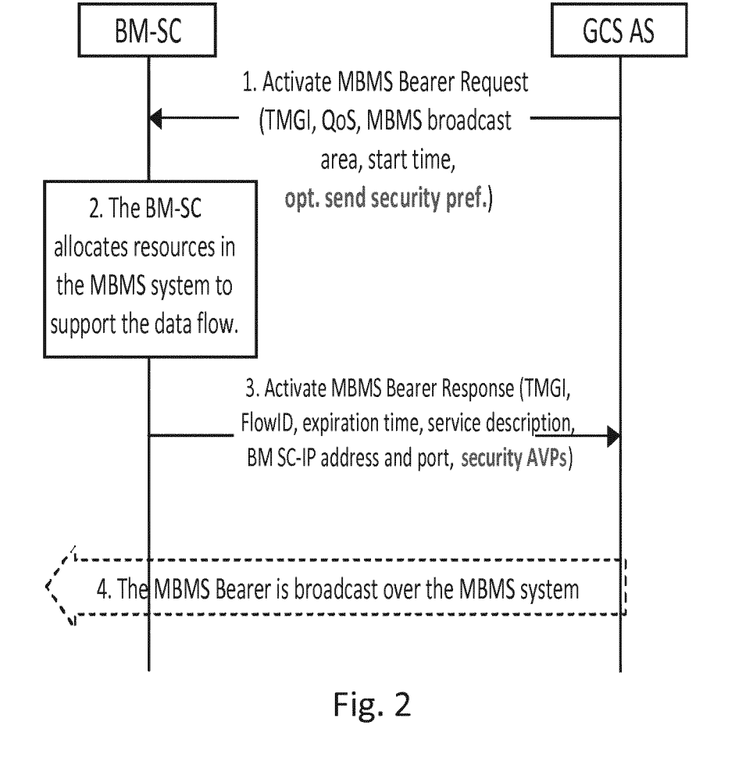
FIG. 2 illustrates an example of the MBMS bearer activation procedure.

FIG. 2 illustrates an example of the activate MBMS bearer procedure. As illustrated in FIG. 2, at 1, the GCS AS may transmit an activate MBMS bearer request. At 2, the BM-SC allocates resources in the MBMS system to support the data flow. Then, at 3, the BM-SC may send an activate MBMS bearer response to the GCS AS. At 4, the MBMS bearer is broadcast over the MBMS system.

However, an attacker/intruder of the system could use the same port to inject forged data, if MB2-U communication is not authorized, i.e., the integrity of the AS is not assured. The status of security work for MB2-U is as such that it has been acknowledged, that MB2-U authorization may be required, but no solution has been provided so far.

Accordingly, embodiments of the invention may provide that the user plane messages between the BM-SC and the GCS AS shall be integrity protected, i.e. by cryptographic or physical protection. As a result, certain embodiments provide a security solution for MB2-U interface.

An embodiment is directed to configuring a security solution for the MB2-U interface comprised of a point to point security association between the AS and the BM-SC. For example, some embodiments may configure the utilization of the Internet Protocol Security (IPsec) [X] and Datagram Transport Layer Security (DTLS) [X] as protocols for the point to point security association. Other protocols may be utilized according to other embodiments.

The protection of the MB2-U interface may be needed if the interface is transmitted using an untrusted network; however, it is up to the operator (i.e., the owner of the BM-SC) to decide whether the MB2-U interface is trusted or physically protected, or whether it needs protection by a cryptographic protocol.

In other words, a problem is that several security options are available, from which GCS AS and BM-SC need to agree on one of these options in a secure way. Thus, embodiments of the invention provide a solution on how to securely negotiate the security options for MB2-U between GCS AS and BM-SC by using MB2-C, for example.

According to an example embodiment, the already established security association on the MB2-C interface may be used to negotiate the security options for the MB2-U interface. In this way, no extra security needs to be set up for protecting the negotiation process for the user data transfer via MB2-U. Also, in an example embodiment, the existing control protocol on the MB2-C interface may be extended to carry the required security parameters, and the operator is allowed to configure BM-SC according to the needs when operating public safety in different countries.

According to one embodiment, when receiving a request via the MB2-C control interface from GCS AS to establish a MB2-U connection, the BM-SC may be configured to instruct the GCS AS in the reply via the MB2-C control interface whether to establish a security association for the user plane in the MB2-U interface and to provide a target IP address and possible use datagram protocol (UDP) [X] port as target for the security association.

When receiving the instructions from the BM-SC, the AS may be configured to start the setup of the security association using a security protocol selected by the AS, and to send the related signalling towards the IP address indicated by the BM-SC.

In one embodiment, the BM-SC may also indicate to the AS which security protocols are supported by the BM-SC by sending a corresponding list to the AS. The BM-SC may additionally indicate the protocol it prefers to use for the security association, in which case the BM-SC orders this list by preference. The AS may then select, from among the security protocols supported by the AS, the security protocol that is the highest on the list received from the BM-SC. Other ways of indicating the preference of security protocol may be possible. If there is no security protocol supported by both AS and BM-SC and the BM-SC instructed the AS to set up a security association, then the AS may report a failure back to the BM-SC. This situation may be avoided by requiring the support of at least one security protocol, such as DTLS.

Examples of security protocols include Internet Key Exchange (IKE)/IPsec [X] or UDP encapsulated IKE/IPsec [X] or DTLS [X]. DTLS is transported over UDP [X], and the AS addresses the UDP packets towards the port provided by the BM-SC.

In an example embodiment using IPsec [X], multiple user plane connections on the MB2-U interface can be transported within the same IPsec security association. The AS may check the source IP address to decide if a security association already exists that the AS may use for sending the user plane data towards the destination address supplied by the BM-SC. The AS may establish a new security association if none exists or a fresh one is preferred.

The BM-SC may also provide a shared key, for instance for use with DTLS [X] or IKE [X] or IKEv2 [X], towards the BM-SC. The BM-SC may also provide additional configuration parameters for the security protocol.

In the reply from the BM-SC to the AS, the indication whether to use a security association, the possible indication about the applicable security protocol, the possible shared key, and the possible additional configuration parameters for the security protocol may be encoded via new Diameter attribute value pairs (AVPs) included within a MBMS- Bearer-Response AVP transported within the GCS-Action-Answer (GAA) command, specified in 3GPP TS 29.468 [X], section 6.6.3.

In an embodiment, the request via the MB2-C control interface from GCS AS to establish a MB2-U connection contains an indication whether the AS desires to establish a security association, and/or information about the security protocol(s) supported by the AS and/or an own IP address and port for the user plane connection. The BM-SC may use this information when selecting the security protocol, and/or a destination to send reply messages required during the establishment of the security association, respectively. Depending on the operator's decision whether the BM-SC via the MB2-U interface should accept only integrity protected user plane messages (i.e., when the operator has not applied physical protection or considers the AS to be within a trusted domain), the BM-SC may also use this information and make its decision on using a security association.

If the AS does not provide an IP address and possible UDP port, the BM-SC may also use the source address and possibly the source port received in the MB2-U message received from the AS to establish the user plane connection as destination for reply messages required during the establishment of the security association.

In the request from the AS to the BM-SC, the indication whether a security association is desired and/or the possible indication about the supported security protocol(s) may be encoded via new Diameter attribute value pairs (AVPs) included within a MBMS-Bearer-Request AVP transported within the GCS-Action-Request (GAR) command, specified in 3GPP TS 29.468 [X], section 6.6.2.

In view of the above, in an embodiment, the BM-SC provides on the control plane (MB2-C) additional information (within a message) to allow establishment of secure tunnels on the data plane between the AS and the BM-SC for each TMGI. The additional information provided by the BM-SC may include, but is not limited to: protocol to use for the secure channel; IP address and port to use on the AS for the secure channel; IP address and port to use on the BM-SC for the secure channel; port of the BM-SC within the secure channel; a shared key; validity time for a secure tunnel, depending on operators' configuration; and more additional options such as cipher suite, minimal key length, etc. As a result, according to this embodiment, the BM-SC is responsible for configuring the secure tunnel (which is aided by the fact that there is already mutual authentication on the control plane between AS and BM-SC).

In an embodiment, a request from the AS may include an indicator as to whether security on MB2-U is desired, which protocols are supported and/or preferred, and which port to use. Depending on the operator's requirements, BM-SC either enforces security with the negotiated parameters or allows user plane messages pass without security.

Figure 3:
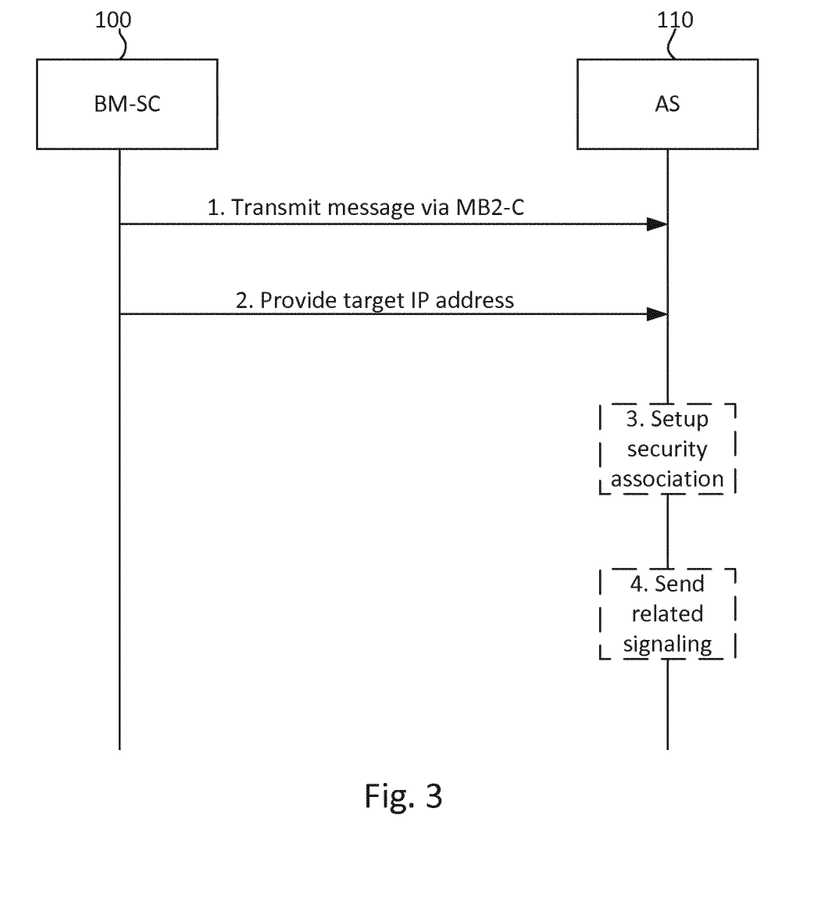
FIG. 3 illustrates a call flow diagram according to an example embodiment.

FIG. 3 illustrates a call flow diagram according to an example embodiment of the invention. As illustrated in FIG. 3, BM-SC 100 may transmit a message to AS 110 via the BM2-C control interface at 1. The message may indicate to the AS 110 whether to establish a security association on a user plane in the MB2-U interface. Also, in one embodiment, the message from BM-SC 100 may include additional information, such as the protocol to use for the secure channel, the IP address and port to use on the AS 110 for the secure channel, the IP address and port to use on the BM-SC 100 for the secure channel, the port of the BM-SC 100 within the secure channel, a shared key, a validity time for a secure tunnel, depending on operators' configuration, and/or more additional options such as cipher suite, minimal key length, etc.

Returning to FIG. 3, in an embodiment, BM-SC 100 may provide a target IP address and possible UDP port as target for the security association at 2. The BM-SC may also indicate to the AS which security protocols are supported by the BM-SC by sending a corresponding list to the AS. The BM-SC may additionally indicate the protocol it prefers to use for the security association, in which case the BM-SC orders this list by preference. At 3, AS 110 may start setting up the security association using a security protocol it selects, for example, from among those provided in the list from the BM-SC. Then, at 4, AS 110 may send related signaling towards the target IP address.

Figure 4A:
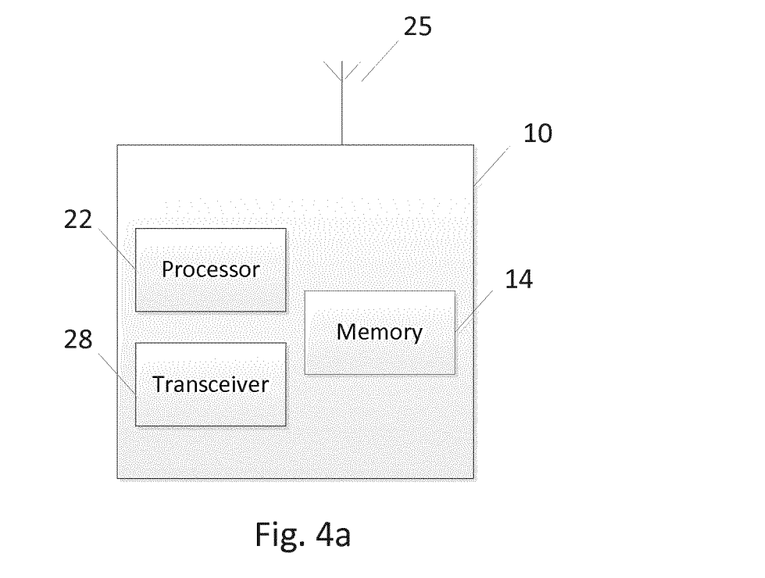
FIG. 4a illustrates a block diagram of an apparatus according to an embodiment.

FIG. 4a illustrates an example of an apparatus 10 according to an embodiment. In an embodiment, apparatus 10 may be a node, host, or server in a communications network or serving such a network, such as a BM-SC. It should be noted that one of ordinary skill in the art would understand that apparatus 10 may include components or features not shown in FIG. 4a.

As illustrated in FIG. 4a, apparatus 10 includes a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a BM-SC as discussed above. In this embodiment, apparatus 10 may be controlled by memory 14 and processor 22 to transmit a message to an AS via a control interface (e.g., MB2-C). The message may indicate whether to establish a security association on a user plane in the MB2-U interface. According to an embodiment, apparatus 10 may be further controlled by memory 14 and processor 22 to provide, to the AS, a target IP address and possible UDP port as a target for the security association.

In certain embodiments, the message transmitted to the AS may also include additional information, such as but not limited to, the protocol to use for the security association, the IP address and port to use on the AS 110 for the security association, the IP address and port to use on the BM-SC 100 for the security association, the port of the BM-SC 100 within the security association, a shared key, a validity time for a security association, depending on operators' configuration, and/or more additional options such as cipher suite, minimal key length, etc.

Figure 4B:
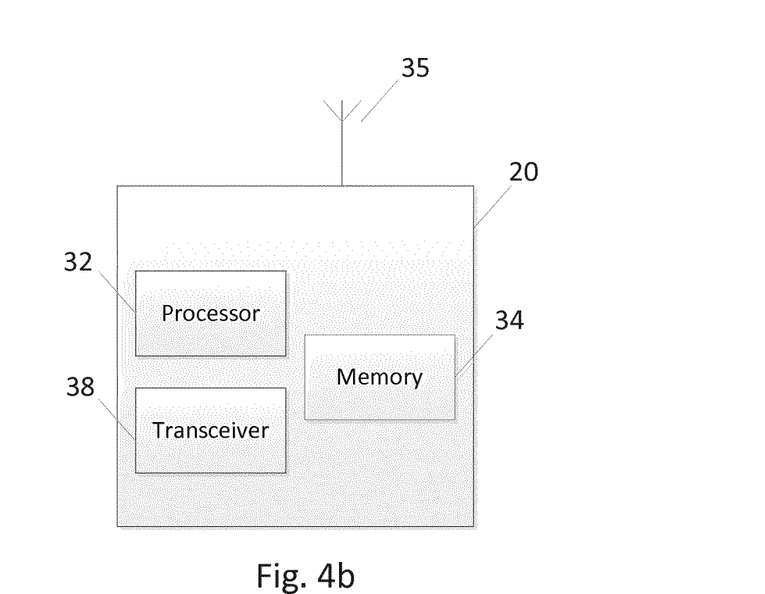
FIG. 4b illustrates a block diagram of an apparatus according to another embodiment.

FIG. 4b illustrates an example of an apparatus 20 according to another embodiment. In an embodiment, apparatus 20 may be a node, host, or server in a communications network or serving such a network, such as an application server. More particularly, in certain embodiments, apparatus 20 may be a group communication service application server. It should be noted that one of ordinary skill in the art would understand that apparatus 20 may include components or features not shown in FIG. 4b. Only those components or features necessary for illustration of the invention are depicted in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be an application server, such as a group communication service application server. In this embodiment, apparatus 20 may be controlled by memory 34 and processor 32 to receive a message from a BM-SC via a control interface (e.g., MB2-C). The message may indicate whether to establish a security association on a user plane in the MB2-U interface. In some embodiments, apparatus 20 may be controlled by memory 34 and processor 32 to further receive a target IP address and possible UDP port as a target for the security association.

In an embodiment, apparatus 20 may also be controlled by memory 34 and processor 32 to setup the security association using a security protocol selected by apparatus 20. According to one embodiment, apparatus 20 may be controlled to receive an indication from the BM-SC of which security protocols are supported by the BM-SC. In an embodiment, the indication may possibly include an ordered list of preference of security protocols. In this case, apparatus 20 may be controlled to start setup of the security association using the security protocol that is supported by apparatus 20 and that is highest in preference on the list received from the BM-SC.

According to one embodiment, apparatus 20 may also be controlled by memory 34 and processor 32 to send related signaling towards the target IP address received from the BM-SC.

Figure 5A:
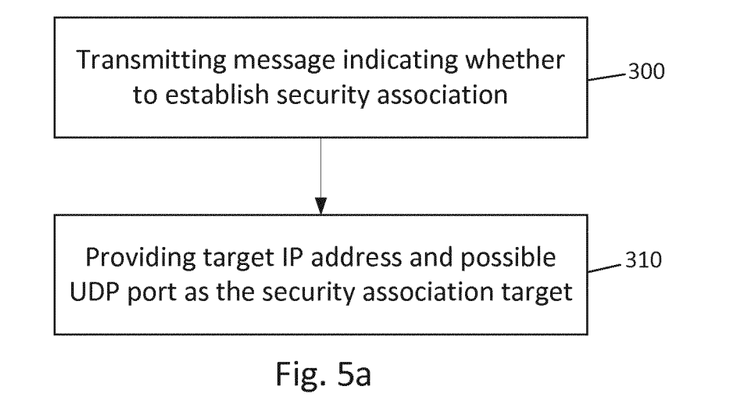
FIG. 5a illustrates a flow diagram of a method according to one embodiment.

FIG. 5a illustrates an example flow diagram of a method, according to one embodiment. The method may include, at 300, transmitting a message, to an AS via a control interface (e.g., MB2-C), indicating whether to establish a security association on a user plane in the MB2-U interface. According to an embodiment, the method may further include, at 310, providing, to the AS, a target IP address and possible UDP port as a target for the security association.

Figure 5B:
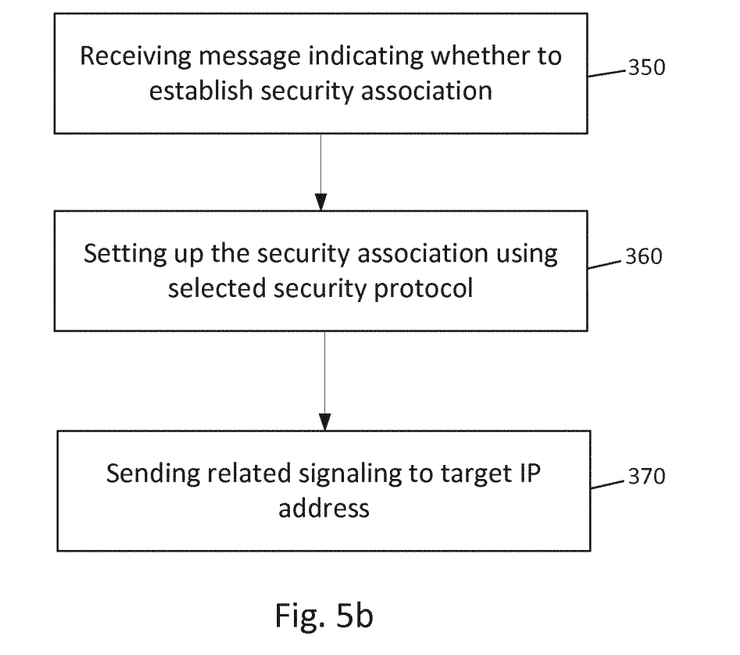
FIG. 5b illustrates a flow diagram of a method according to another embodiment.

FIG. 5b illustrates an example flow diagram of a method, according to another embodiment. The method may include, at 350, receiving a message from a BM-SC via a control interface (e.g., MB2-C). The message may indicate whether to establish a security association on a user plane in the MB2-U interface. In some embodiments, the method may also include receiving a target IP address and possible UDP port as a target for the security association. The method may then include, at 360, setting up the security association using a security protocol selected by the AS. In an embodiment, the method may include, at 370, sending related signaling towards the target IP address.

In some embodiments, the functionality of any of the methods described herein, such as those illustrated in FIGS. 3a and 3b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention may provide several advantages. Normally, if using IPSec, the two parties involved have to be preconfigured. However, using the already established secure MB2-C interface allows automatic configuration by the BM-SC without manual intervention/pre-configuration. If security information/key material to set up the security association is communicated via the MB2-C, then MB2-U interface can use off-the-shelf IPsec software stacks. BM-SC can act autonomously, and will be responsible of generating key material and keeping track of the security associations. Therefore, embodiments can keep the impact on the existing MB2-C solution as minimal as possible but solve the security negotiation issue for MB2-U. Nonetheless, BM-SC may keep a record of the relation TMGI and security info. Operators can configure the BM-SC with respect to MB2-U security negotiation according to their requirements.

The following documents or specifications may include certain requirements, system architecture, and technical details, that may relate to embodiments of the invention: 3GPP TS 22.468: "Group Communication System Enablers for LTE (GCSE_LTE)"; 3GPP TS 23.468: "Group Communication System Enablers for LTE (GCSE_LTE); stage 2"; 3GPP TS 29.468: "Group Communication System Enablers for LTE (GCSE_LTE); MB2 Reference Point; Stage 3"; 3GPP TS 33.246: "Security of Multimedia Broadcast/Multicast Service (MBMS)"; IETF RFC 3588: "Diameter Base Protocol".IETF RFC 6733: "Diameter Base Protocol"; IETF RFC (IPsec) 4301: "Security Architecture for the Internet Protocol"; IETF RFC (TLS) 5246: "The Transport Layer Security (TLS) Protocol Version 1.2"; IETF RFC (DTLS) 6347: "Datagram Transport Layer Security Version 1.2"; IETF RFC 768: "User Datagram Protocol (UDP)"; IETF RFC 3948: "UDP Encapsulation of IPsec ESP Packets"; IETF RFC 5996: "Internet Key Exchange Protocol Version 2 (IKEv2)". IETF RFC 2409: "The Internet Key Exchange (IKE)"; 3GPP TR 33.888; 3GPP TS 29.368: "Tsp interface protocol between the MTC Interworking Function (MTC-IWF) and Service Capability Server (SCS); Stage 3". The entire contents of these documents are hereby incorporated by reference in their entirety.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    transmitting a message via a control plane, on a MB2 control interface, to a group communication service (GCS) application server from a broadcast multicast service center (BM-SC), indicating whether to establish a security association configured for secure negotiation of security options on a user plane in a MB2 user interface between the GCS application server and the BM-SC; and
    providing, to the GCS application server, a target internet protocol address and a possible user datagram protocol (UDP) port as a target for the security association,
    wherein the method further comprises receiving a request via a MB2 interface control plane part (MB2-C) from the GCS application server to establish a MB2 interface user plane part (MB2-U) connection, and
    wherein the transmitting further comprises instructing the GCS application server in a reply via the MB2 interface control plane part whether to establish a security association for the user plane in the MB2 interface user plane part.

2. The method according to claim 1, wherein the providing further comprises providing at least one of: the target internet protocol address and the possible UDP port to use on the GCS application server for the security association, the target internet protocol address and the possible UDP port to use on the BM-SC for the security association, a shared key, a validity time for the security association, or more additional options including cipher suite and/or minimal key length.

3. The method according to claim 1,
    wherein the providing further comprises providing the target internet protocol address and UDP port as the target for the security association.

4. A computer program, embodied on a non-transitory computer readable medium, the computer program configured to control a processor to perform a method according to claim 1.

5. An apparatus, comprising:
    at least one processor; and
    at least one memory comprising computer program code, the at least one memory and the computer program code are configured, with the at least one processor, to cause the apparatus at least to:
    transmit a message via a control plane, on a MB2 control interface, to a group communication service (GCS) application server, indicating whether to establish a security association configured for secure negotiation of security options on a user plane in a MB2 user interface between the GCS application server and the apparatus; and
    provide, to the GCS application server, a target internet protocol address and a possible user datagram protocol (UDP) port as a target for the security association, wherein the at least one memory and the computer program code are configured, with the at least one processor, to further cause the apparatus at least to:

receive a request via a MB2 interface control plane part control interface from the GCS application server to establish a MB2 interface user plane part connection, and instruct the GCS application server in a reply via the MB2 interface control plane part control interface whether to establish a security association for the user plane in the MB2 interface user plane part interface.

6. The apparatus according to claim 5, wherein the providing further comprises providing at least one of: an internet protocol address and possible UDP port to use on the GCS application server for the security association, the internet protocol address and the possible UDP port to use on the apparatus for the security association, a shared key, a validity time for a security association, or more additional options including cipher suite and/or minimal key length.

7. The apparatus according to claim 5, wherein the at least one memory and the computer program code are configured, with the at least one processor, to further cause the apparatus at least to:

provide the target internet protocol address and UDP port as the target for the security association.

8. The apparatus according to claim 5, wherein the apparatus comprises a broadcast multicast service center (BM-SC).

9. An apparatus, comprising:

transmitting means for transmitting a message via a control plane, on a MB2 control interface, to a group communication service (GCS) application server, indicating whether to establish a security association configured for secure negotiation of security options on a user plane in a MB2 user interface between the GCS application server and the apparatus; and providing means for providing, to the GCS application server, a target internet protocol address and a possible user datagram protocol (UDP) port as a target for the security association, the apparatus further comprising receiving means for receiving a request via a MB2 interface control plane part (MB2-C) from the GCS application server to establish a MB2 interface user plane part (MB2-U) connection, wherein the transmitting further comprises instructing the GCS application server in a reply via the MB2 interface control plane part whether to establish a security association for the user plane in the MB2 interface user plane part.

10. A method, comprising:

receiving, at a group communication service (GCS) application server, a message from a broadcast multicast service center (BM-SC) via a control plane, on a MB2 control interface, wherein the message indicates whether to establish a security association configured for secure negotiation of security options on a user plane in a MB2 user interface between the GCS application server and the BM-SC; and receiving a target internet protocol address and a possible user datagram protocol (UDP) port as a target for the security association, wherein the method further comprises transmitting a request via a MB2 interface control plane part (MB2-C) to establish a MB2 interface user plane part (MB2-U) connection, and wherein the receiving the message further comprises receiving instructions in a reply via the MB2 interface control plane part whether to establish a security association for the user plane in the MB2 interface user plane part.

11. The method according to claim 10, further comprising setting up the security association using a security protocol selected by the GCS application server.

12. The method according to claim 11, wherein the security protocol comprises at least one of: internet key exchange/internet protocol security, UDP encapsulated internet key exchange/internet protocol security, and datagram transport layer security.

13. The method according to claim 10, further comprising sending related signaling towards the target internet protocol address indicated by the BM-SC.

14. An apparatus, comprising:

at least one processor; and at least one memory comprising computer program code, the at least one memory and the computer program code are configured, with the at least one processor, to cause the apparatus at least to:

receive a message from a broadcast multicast service center (BM-SC) via a control plane, on a MB2 control interface, wherein the message indicates whether to establish a security association configured for secure negotiation of security options on a user plane in a MB2 user interface between the apparatus and the BM-SC, wherein the apparatus comprises a group communication server (GCS) application server; and receive a target internet protocol address and a possible user datagram protocol (UDP) port as a target for the security association, wherein the at least one memory and the computer program code are configured, with the at least one processor, to further cause the apparatus at least to:

transmit a request via a MB2 interface control plane part control interface to establish a MB2 interface user plane part connection, and the receiving the message further comprises receiving instructions in a reply via the MB2 interface control plane part control interface whether to establish a security association for the user plane in the MB2 interface user plane part interface.

15. The apparatus according to claim 14, wherein the at least one memory and the computer program code are configured, with the at least one processor, to further cause the apparatus at least to set up the security association using a security protocol selected by the GCS application server.

16. The apparatus according to claim 15, wherein the security protocol comprises at least one of: internet key exchange/internet protocol security, UDP encapsulated internet key exchange/internet protocol security, and datagram transport layer security.

17. The apparatus according to claim 14, wherein the at least one memory and the computer program code are configured, with the at least one processor, to further cause the apparatus at least to send related signaling towards the target internet protocol address indicated by the BM-SC.

18. An apparatus, comprising:

receiving means for receiving a message from a broadcast multicast service center (BM-SC) via a control plane, on a MB2 control interface, wherein the message indicates whether to establish a security association configured for secure negotiation of security options on a user plane in a MB2 user interface between the apparatus and the BM-SC, wherein the apparatus comprises a group communication server (GCS) application server; and receiving means for receiving a target internet protocol address and a possible user datagram protocol (UDP) port as a target for the security association, the apparatus further comprising transmitting means for transmitting a request via a MB2 interface control plane part control interface to establish a MB2 interface user plane part connection, wherein the receiving the message further comprises receiving instructions in a reply via the MB2 interface control plane part control interface whether to establish a security association for the user plane in the MB2 interface user plane part interface.

\* \* \* \* \*